(12) United States Patent
Goto et al.

(10) Patent No.: US 12,207,210 B2
(45) Date of Patent: Jan. 21, 2025

(54) RECEIVING METHOD, WIRELESS COMMUNICATION METHOD, RECEIVING STATION, WIRELESS COMMUNICATION SYSTEM, AND RECEIVING PROGRAM

(71) Applicant: NIPPON TELEGRAPH AND TELEPHONE CORPORATION, Tokyo (JP)

(72) Inventors: Daisuke Goto, Musashino (JP); Fumihiro Yamashita, Musashino (JP); Kiyohiko Itokawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 337 days.

(21) Appl. No.: 17/801,629

(22) PCT Filed: Feb. 27, 2020

(86) PCT No.: PCT/JP2020/008106
§ 371 (c)(1),
(2) Date: Aug. 23, 2022

(87) PCT Pub. No.: WO2021/171504
PCT Pub. Date: Sep. 2, 2021

(65) Prior Publication Data
US 2023/0082303 A1 Mar. 16, 2023

(51) Int. Cl.
*H04J 11/00* (2006.01)
*H04B 7/0413* (2017.01)
(Continued)

(52) U.S. Cl.
CPC ........ *H04W 56/001* (2013.01); *H04B 7/0413* (2013.01); *H04L 25/0204* (2013.01)

(58) Field of Classification Search
None
See application file for complete search history.

(56) References Cited

U.S. PATENT DOCUMENTS 6,111,710 A * 8/2000 Feyh ................. G11B 20/10037
360/65
6,836,507 B1 * 12/2004 Gifford .................. H04L 7/042
375/150
(Continued)

OTHER PUBLICATIONS

G. Gallinaro et al., Perspectives of adopting interference mitigation techniques in the context of broadband multimedia satellite systems, 23rd AIAA International Communications Satellite Systems Conference, ICSSC 2005, Sep. 25, 2005.
(Continued)

*Primary Examiner* — Sai Aung

(57) ABSTRACT

A plurality of control signals transmitted in individual frequency bands by a moving transmission station via a plurality of transmission antennas and a plurality of data signals transmitted in a common frequency band by the transmission station via the plurality of transmission antennas in synchronization with the control signals are received by each of a plurality of antennas disposed at different positions. Based on symbol timings of the control signals received by the antenna, a sampling rate error between the plurality of control signals transmitted by the plurality of transmission antennas, respectively, is compensated for. Based on the control signals subjected to the sampling rate error compensation, frame timings of the plurality of data signals transmitted by the transmission station via the plurality of transmission antennas are synchronized. Based on the control signals subjected to the sampling rate error compensation, channels for the plurality of data signals transmitted by the transmission station via the plurality of transmission antennas are estimated. The plurality of data
(Continued)

signals with the frame timings synchronized, for the estimated channels are equalized.

4 Claims, 9 Drawing Sheets

(51) Int. Cl.
    *H04J 3/06*         (2006.01)
    *H04L 25/02*       (2006.01)
    *H04L 27/26*       (2006.01)
    *H04W 56/00*     (2009.01)
    *H04W 72/04*     (2023.01)

(56) References Cited

U.S. PATENT DOCUMENTS

| | | | |
|---|---|---|---|
| 6,856,648 B1* | 2/2005 | Hyll | H04L 27/2675 |
| | | | 375/232 |
| 6,995,594 B2* | 2/2006 | Buchwald | H04L 25/03006 |
| | | | 327/248 |
| 2008/0048897 A1* | 2/2008 | Parthasarthy | H03M 1/0836 |
| | | | 341/122 |
| 2008/0187082 A1* | 8/2008 | Bhoja | H04L 7/0062 |
| | | | 375/371 |
| 2010/0080311 A1* | 4/2010 | Moffatt | H04L 27/2618 |
| | | | 375/132 |
| 2013/0315346 A1* | 11/2013 | Varma | H04H 40/90 |
| | | | 375/316 |
| 2023/0082303 A1* | 3/2023 | Goto | H04W 56/003 |
| | | | 370/350 |

OTHER PUBLICATIONS

Dongwook Choi et al., Resource allocation for CoMP with multiuser MIMO-OFDMA, IEEE Transactions on Vehicular Technology, vol. 60, No. 9, 2011, pp. 4626-4632.

* cited by examiner

RECEIVING METHOD, WIRELESS COMMUNICATION METHOD, RECEIVING STATION, WIRELESS COMMUNICATION SYSTEM, AND RECEIVING PROGRAM

CROSS-REFERENCE TO RELATED APPLICATIONS

This application is a 371 U.S. National Phase of International Application No. PCT/JP2020/008106, filed on Feb. 27, 2020. The entire disclosure of the above application is incorporated herein by reference.

TECHNICAL FIELD

The present invention relates to a reception method, a wireless communication method, a reception station, a wireless communication system and a reception program.

BACKGROUND ART

In terrestrial wireless communications, a method for enhancing the efficiency in use of frequencies based on MIMO (multiple-input and multiple-output) multiplex transmission using a plurality of transmission/reception antennas is known. In order to enhance a transmission capacity according to this method, it is essential that channel correlation between the transmission/reception antennas be low.

On the other hand, in satellite communications, communication is performed in a line-of-sight environment, and thus, where MIMO transmission between one transmission station and one reception station is performed, correlation between antennas become high, which may result in no expectation of transmission capacity enhancement. However, it is known that low-correlation channels in MIMO transmission in a line-of-sight environment can be formed by providing an angle-of-arrival difference between antennas.

For example, a technique that operates a multi-beam satellite with a same frequency and that employs the MIMO technique for user-to user transmission with respective beams is known (see, for example, Non-Patent Literature 1). For this technique, a transmission precoding technique in which channel estimation is performed in advance using a pilot signal transmitted from a base station, estimation information is provided to a base station and based on the provided estimation information, a transmitted signal is multiplied by a precoding matrix so that interferential components in the channels are cancelled out at the time of transmission is employed.

This form of transmission can be regarded as multi-user MIMO in which spatial multiplex transmission is performed for a plurality of users by regarding respective beams as signals from a single antenna. Also, for user-to-user interference that occurs because of transmission using a same frequency, a method in which the interference is reduced by employment of transmission precoding is being studied.

In this method, if a distance between users that perform transmission simultaneously is large, a difference between angles of arrival from transmission antennas becomes large, enabling provision of low correlation. For example, this technique is used for service links from a satellite to users.

Here, a case where this technique is applied to a circuit (feeder link) that links a base station and a satellite in communication requiring channel variation such as communication via a low-orbit satellite will be considered.

Since a feeder link channel for a low-orbit satellite varies at high speed, even if channel information is estimated in advance on the transmission side like Non-Patent Literature 1, it is difficult to follow the variation, and thus, processing on the reception side is necessary.

Furthermore, in the feeder link, a target of communication on the ground is the base station, and thus, in order to provide a difference between angles of arrival from the satellite, it is necessary to increase a distance between a plurality of antennas of the base station.

However, there is a case where clocks for signals are not common to the antennas disposed at different sites. In this case, a clock error that occurs between received signals may largely affect MIMO demodulation characteristics.

Non-Patent Literature 2 describes a study on an adaptive modulation scheme for multi-user MIMO-OFMA (orthogonal frequency-division multiple access) in CoMP (coodinated multiple point) transmission in which a plurality of base stations perform interference compensation in a coordinated manner in cellular communication.

The technique described in Non-Patent Literature 2 can be regarded as enabling a plurality of base stations disposed remotely from each other to perform MIMO transmission using a plurality of antennas, which, however, is based on the premise that clocks are common to the base stations.

CITATION LIST

Non-Patent Literature

Non-Patent Literature 1: G. Gallinaro, G. Caire, M. Debbah, L. Cottatellucci, R. Muller, and R. Rinaldo, "Perspectives of adopting interference mitigation techniques in the context of broadband multimedia satellite systems," 23rd AIAA Int. Commun. Satell. Syst. Conf., ICSSC2005, Sept. 2005.

Non-Patent Literature 2: C. Dongwook, D. Lee, and J. H. Lee, "Resource allocation for CoMP with multiuser MIMO-OFDMA," in IEEE Transactions on Vehicular Technology, vol. 60, no. 9, pp. 4626-4632, Nov. 2011.

SUMMARY OF THE INVENTION

Technical Problem

As stated above, the conventional techniques have the problem of difficulty in enhancement in accuracy of channel estimation and synchronization between antennas on the base station side in MIMO transmission between a satellite and a base station.

An object of the present invention is to provide a reception method, a wireless communication method, a reception station, a wireless communication system and a reception program that enable, even if a plurality of antennas are disposed at different positions, receiving signals transmitted by a moving transmission station via a plurality of transmission antennas, in such a manner that the signals are synchronized.

Means for Solving the Problem

A reception method according to an aspect of the present invention includes: a reception step of receiving a plurality of control signals transmitted in individual frequency bands by a moving transmission station via a plurality of transmission antennas and a plurality of data signals transmitted in a common frequency band by the transmission station via the plurality of transmission antennas in synchronization with the control signals, via each of a plurality of antennas disposed at different positions; a resampling step of, based on symbol timings of the control signals received via the antenna, compensating for a sampling rate error between the respective control signals transmitted by the plurality of transmission antennas; a frame synchronization step of, based on the control signals subjected to the sampling rate error compensation, synchronizing frame timings of the plurality of data signals transmitted by the transmission station via the plurality of transmission antennas; a channel estimation step of, based on the control signals subjected to the sampling rate error compensation, estimating channels for the plurality of data signals transmitted by the transmission station via the plurality of transmission antennas; and an equalization step of equalizing the plurality of data signals with the frame timings synchronized, for the estimated channels.

Also, a wireless communication method according to an aspect of the present invention includes: a transmission step of causing a moving transmission station to transmit a plurality of control signals transmitted in individual frequency bands and transmit a plurality of data signals in a common frequency band in synchronization with the control signals, via a plurality of transmission antennas; a reception step of causing a reception station to receive the plurality of control signals and the plurality of data signals transmitted by the transmission station, via each of a plurality of antennas disposed at different positions; a resampling step of, based on symbol timings of the control signals received via the antenna, compensating for a sampling rate error between the respective control signals transmitted by the plurality of transmission antennas; a frame synchronization step of, based on the control signals subjected to the sampling rate error compensation, synchronizing frame timings of the plurality of data signals transmitted by the transmission station via the plurality of transmission antennas; a channel estimation step of, based on the control signals subjected to the sampling rate error compensation, estimating channels for the plurality of data signals transmitted by the transmission station via the plurality of transmission antennas; and an equalization step of equalizing the plurality of data signals with frame timings synchronized, for the estimated channels.

Also, a reception station according to an aspect of the present invention includes: a plurality of antennas that are disposed at different positions and that each receive a plurality of control signals transmitted in individual frequency bands by a moving transmission station via a plurality of transmission antennas and a plurality of data signals transmitted in a common frequency band by the transmission station via the plurality of transmission antennas in synchronization with the control signals; a plurality of resamplers that, based on symbol timings of the control signals received by the relevant antenna, each compensate for a sampling rate error between the respective control signals transmitted via the plurality of transmission antennas; a frame synchronization unit that, based on the control signals subjected to the sampling rate error compensation by the plurality of resamplers, synchronizes frame timings of the plurality of data signals transmitted by the transmission station via the plurality of transmission antennas; a channel estimation unit that, based on the control signals subjected to the sampling rate error compensation by the plurality of resamplers, estimates channels for the plurality of data signals transmitted by the transmission station via the plurality of transmission antennas; and an equalization unit that equalizes the plurality of data signals with the frame timings synchronized by the frame synchronization unit, the channels for the plurality of data signals being estimated by the channel estimation unit.

Also, a wireless communication system according to an aspect of the present invention includes a reception station that receives signals transmitted by a moving transmission station, wherein: the transmission station includes a plurality of transmission antenna that transmit a plurality of control signals transmitted in individual frequency bands and transmit a plurality of data signals in a common frequency band in synchronization with the control signals; and the reception station includes a plurality of antennas that are disposed at different positions and that each receive the plurality of control signals and the plurality of data signals transmitted by the transmission station, a plurality of resamplers that, based on symbol timings of the control signals received by the relevant antennas, each compensate for a sampling rate error between the respective control signals transmitted via the plurality of transmission antennas, a frame synchronization unit that, based on the control signals subjected to the sampling rate error compensation by the plurality of resamplers, synchronizes frame timings of the plurality of data signals transmitted by the transmission station via the plurality of transmission antennas, a channel estimation unit that, based on the control signals subjected to the sampling rate error compensation by the plurality of resamplers, estimates channels for the plurality of data signals transmitted by the transmission station via the plurality of transmission antennas, and an equalization unit that equalizes the plurality of data signals with the frame timings synchronized by the frame synchronization unit, the channels for the plurality of data signals being estimated by the channel estimation unit.

Effects of the Invention

The present invention enables, even if a plurality of antennas are disposed at different positions, receiving signals transmitted by a moving transmission station via a plurality of transmission antennas, in such a manner that the signals are synchronized.

DESCRIPTION OF EMBODIMENTS

Figure 1:
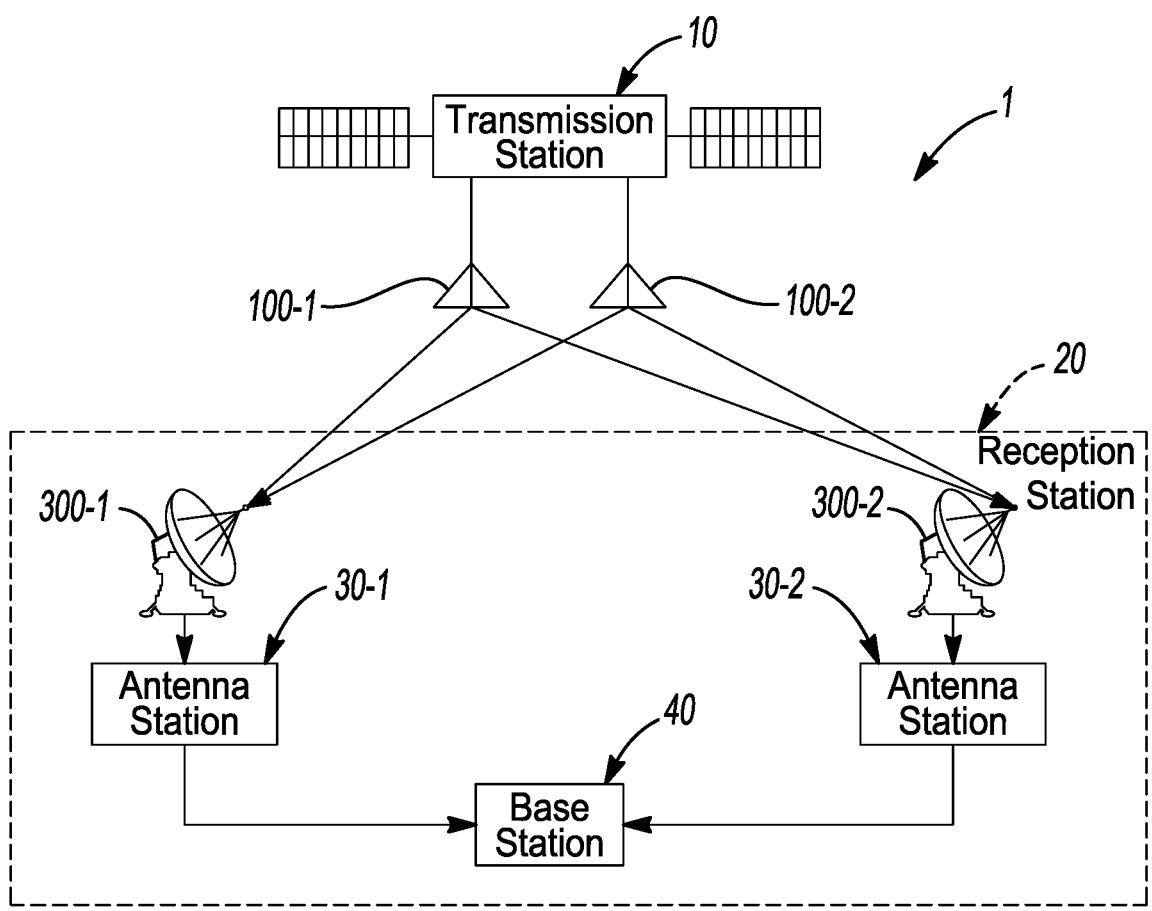
FIG. 1 is a diagram illustrating, by example, an overview of a wireless communication system according to an embodiment.

An embodiment of a wireless communication system will be described below with reference to the drawings. FIG. 1 is a diagram illustrating, by example, an overview of a wireless communication system 1 according to an embodiment. The wireless communication system 1 is, for example, a satellite communication system including a low-orbit satellite 10 and a ground station 20.

For example, where the low-orbit satellite 10 is a satellite transponder, the low-orbit satellite 10 performs frequency conversion of signals transmitted from a user terminal station on an uplink of a service link and transmits the signals to the ground station 20 on a downlink.

Also, for example, where the low-orbit satellite 10 is an observation satellite, the low-orbit satellite 10 collects observed images and/or information from, e.g., radar and transmits signals of the images and/or the information at a timing at which communication with the ground station 20 is enabled.

Here, a satellite-ground station downlink system in which signals transmitted from the low-orbit satellite 10 are received by the ground station 20 will be described, and thus, hereinafter, the low-orbit satellite 10 is referred to as "transmission station 10" and the ground station 20 is referred to as "reception station 20".

The transmission station 10 is, for example, a multi-beam satellite including two antennas (transmission antennas) 100-1, 100-2 and performs wireless communication with, e.g., the reception station 20 via MIMO transmission while moving on a predetermined orbit.

The antennas 100-1, 100-2 individually transmit signals to the reception station 20. Each of the signals that the antennas 100-1, 100-2 transmit is a beam involving channel variation. Note that the respective signals that the antennas 100-1, 100-2 transmit do not need to be synchronized between the antennas but may be transmitted at different timings.

Also, the transmission station 10 transmits data signals with a same (common) frequency via the respective antennas 100-1, 100-2 and transmits control signals in other bands. Here, the transmission station 10 transmits control signals from the antennas 100-1, 100-2 in individual frequency bands for the antennas 100-1, 100-2. In the transmission station 10, the control signals and the data signals are synchronized.

The reception station 20 includes, for example, two antenna stations 30-1, 30-2 and a base station 40. The antenna station 30-1 includes an antenna 300-1 and functions as an antenna for the base station 40. Also, the antenna station 30-2 includes an antenna 300-2 and functions as an antenna for the base station 40.

The antenna stations 30-1, 30-2 are disposed at respective positions distant from each other so that a difference between angles of arrival of signals from the antennas 100-1, 100-2 included in the transmission station 10 becomes large. In other words, the reception station 20 is configured to receive signals transmitted by the transmission station 10 via each of the antenna stations 30-1, 30-2, aggregate the received signals into the base station 40 and perform equalization and demodulation.

Note that clocks used for operation of the antenna station 30-1 and clocks used for operation of the antenna station 30-2 are supplied from different sources and not synchronized.

Figure 2:
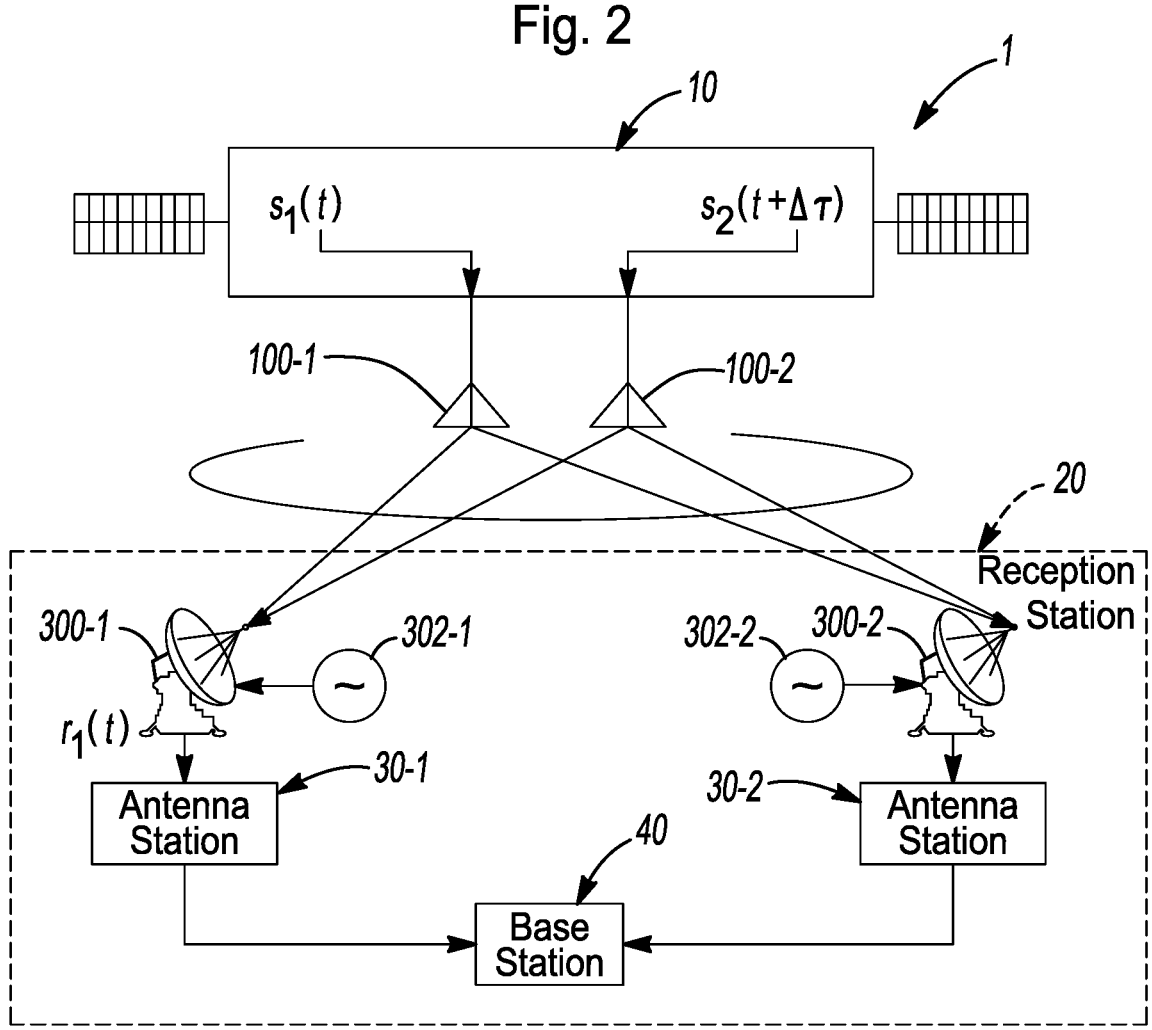
FIG. 2 is a diagram illustrating an overview of functions of a wireless communication system according to an embodiment.

Next, an overview of functions of the wireless communication system 1 will more specifically be described with reference to FIG. 2. In the below, where which of a plurality of components such as the antenna stations 30-1, 30-2 is not identified, such component is simply abbreviated as, for example, "antenna station 30".

The transmission station 10 transmits different signals from the antennas 100-1, 100-2, respectively. It is assumed that: timings of temporal waveforms $s_1(t)$, $s_2(t)$ of the respective transmitted signals are not synchronized; and timing errors $\Delta \tau_1$, $\Delta \tau_2$ occur in the respective temporal functions.

Also, each of channels between the transmission station 10 and the antenna stations 30-1, 30-2 is a channel in which direct wave is dominant, and has a flat frequency characteristic. Therefore, a temporal waveform S(t) of a transmitted signal and a temporal waveform R(t) of a received signal have the channel characteristic indicated in Expression (1) below in a certain section.

[Math. 1]
$$R(t) = \begin{pmatrix} r_1(t) \\ r_2(t) \end{pmatrix} = HS(t) + N(t) = \begin{pmatrix} h_{11} & h_{12} \\ h_{21} & h_{22} \end{pmatrix} \begin{pmatrix} s_1(t) \\ s_2(t+\Delta\tau) \end{pmatrix} + \begin{pmatrix} n_1(t) \\ n_2(t) \end{pmatrix} \quad (1)$$

Here, Expression (2) below is a channel matrix.

[Math. 2]
$$H = \begin{pmatrix} h_{11} & h_{12} \\ h_{21} & h_{22} \end{pmatrix} \quad (2)$$

Also, $n_1(t)$ and $n_2(t)$ are noise of the antenna stations 30-1, 30-2, respectively.

When the base station 40 demodulates the received signal, the base station 40 needs to perform equalization using sampling information of the received signals r(t). For example, in the case of equalization using ZF (Zero Forcing), the base station 40 demodulates a transmitted signal by multiplying the received signal by an inverse matrix $H^{-1}$ of the channel matrix as indicated in Expression (3) below.

[Math. 3]
$$H^{-1}R(t)=H^{-1}HS(t)+H^{-1}N(t)=S(t)+H^{-1}N(t) \quad (3)$$

Also, it is assumed that: the antenna stations 30-1, 30-2 are disposed a large distance away from each other; and a reception timing error between the antenna stations 30-1, 30-2 has a value exceeding a frame length. In other words, unless the reception timing error between the antenna stations 30-1, 30-2 is compensated for, the reception station 20 performs the aforementioned equalization of the received signals having different timings, and the demodulation results in a failure.

Also, the antenna stations 30-1, 30-2 individually include respective clock generation sources 302-1, 302-2, and thus, have different clock generation sources. In other words, if the reception station 20 performs sampling of received signals without compensating for the reception timing error between the antenna stations 30-1, 30-2, an error occurs between sampling clocks for $r_1(t)$ and $r_2(t)$, which results in degradation in demodulation characteristic.

Therefore, the reception station 20 compensates for the reception timing error between the antenna stations 30-1, 30-2, and even if the antenna stations 30-1, 30-2 are disposed at different positions, receives signals transmitted by the moving transmission station 10 via the antennas 100-1, 100-2, in such a manner that the signals are synchronized.

Figure 3:
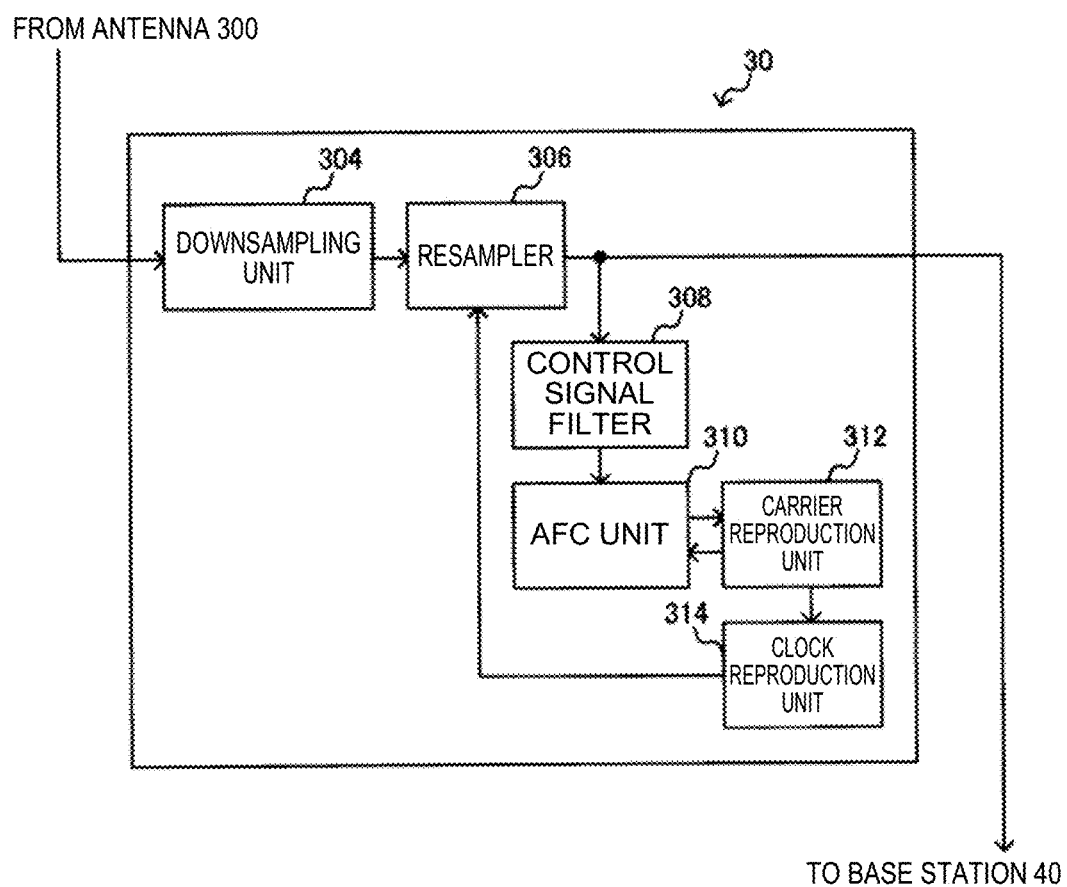
FIG. 3 is a function block diagram illustrating, by example, functions that an antenna station has.

Next, functions that each antenna station 30 has will more specifically be described. FIG. 3 is a function block diagram illustrating, by example, functions that an antenna station 30 has. As illustrated in FIG. 3, an antenna station 30 includes a downsampling unit 304, a resampler 306, a control signal filter 308, an AFC (automatic frequency control) unit 310, a carrier reproduction unit 312 and a clock reproduction unit 314 that process a signal received by the antenna 300.

The downsampling unit 304 performs downsampling of signals received by the antenna 300 (see FIGS. 4 and 5) and outputs the resulting signals to the resampler 306.

Figure 4:
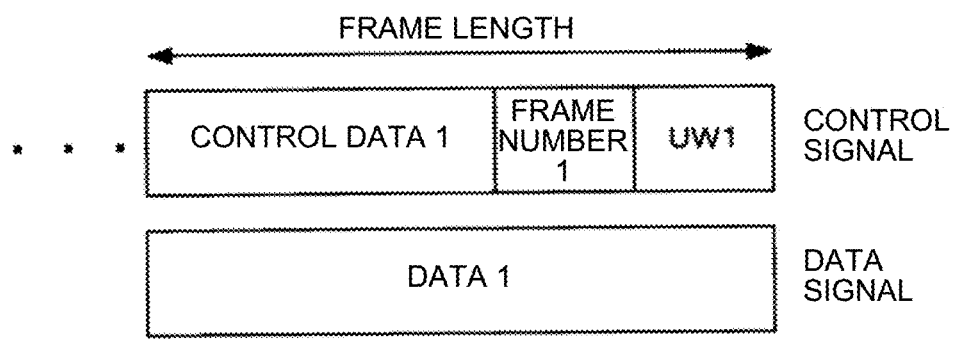
FIG. 4 is a diagram illustrating formats of signals that an antenna receives.

FIG. 4 is a diagram illustrating formats of signals received by an antenna 300. As illustrated in FIG. 4, an antenna 300 receives a control signal and a data signal synchronized with the control signal. The control signal includes a UW (known sequence), a frame number and control data on a time axis. The data signal is consisted of data alone.

Figure 5:
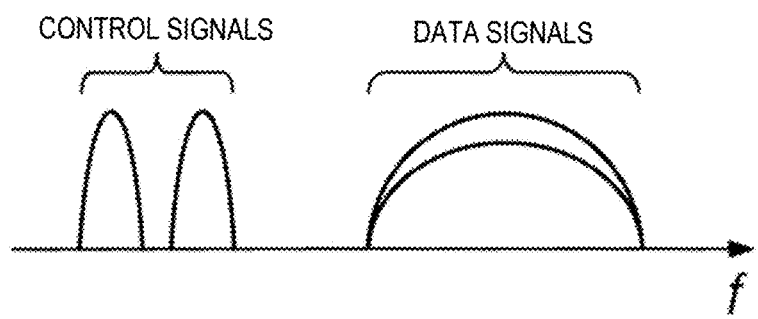
FIG. 5 is a diagram illustrating bands of signals that a reception station receives.

FIG. 5 is a diagram illustrating bands of signals received by the reception station 20. As illustrated in FIG. 5, the reception station 20 receives control signals with different frequencies allocated to the antennas 100-1, 100-2, respectively, and data signals allocated in a predetermined frequency band that is different from those of the control signals and superimposed.

The resampler 306 (FIG. 3) performs resampling for converting the received signals subjected to the downsampling by the downsampling unit 304, so as to have a predetermined sampling rate.

The control signal filter 308 transmits the control signals only from among the received signals subjected to the sampling rate conversion by the resampler 306, and outputs the control signals to the AFC unit 310.

The AFC unit 310 performs frequency shifting so that an error in frequency of control signal is compensated for and outputs the resulting signals to the carrier reproduction unit 312.

The carrier reproduction unit 312 detects a phase error between symbols of the control signal and compensates for the phase error. Also, the carrier reproduction unit 312 detects an error in frequency from IQ phase variation (phase error value) on the time axis of the control signals and outputs a compensation value for the error in frequency to the AFC unit 310 as reproduction of a carrier.

The clock reproduction unit 314 detects a symbol timing error between symbol sequences of the control signal subjected to the carrier reproduction by the carrier reproduction unit 312, and outputs a compensation value for the symbol timing to the resampler 306 as reproduction of a clock. Here, the clock reproduction unit 314 compensates for the symbol timing error so that a halfway point between +1 and −1 of each symbol becomes 0.

Then, the resampler 306 compensates for a sampling rate error based on the symbol timing error and outputs the received signals with the sampling rate error compensated for to the base station 40.

Figure 6:
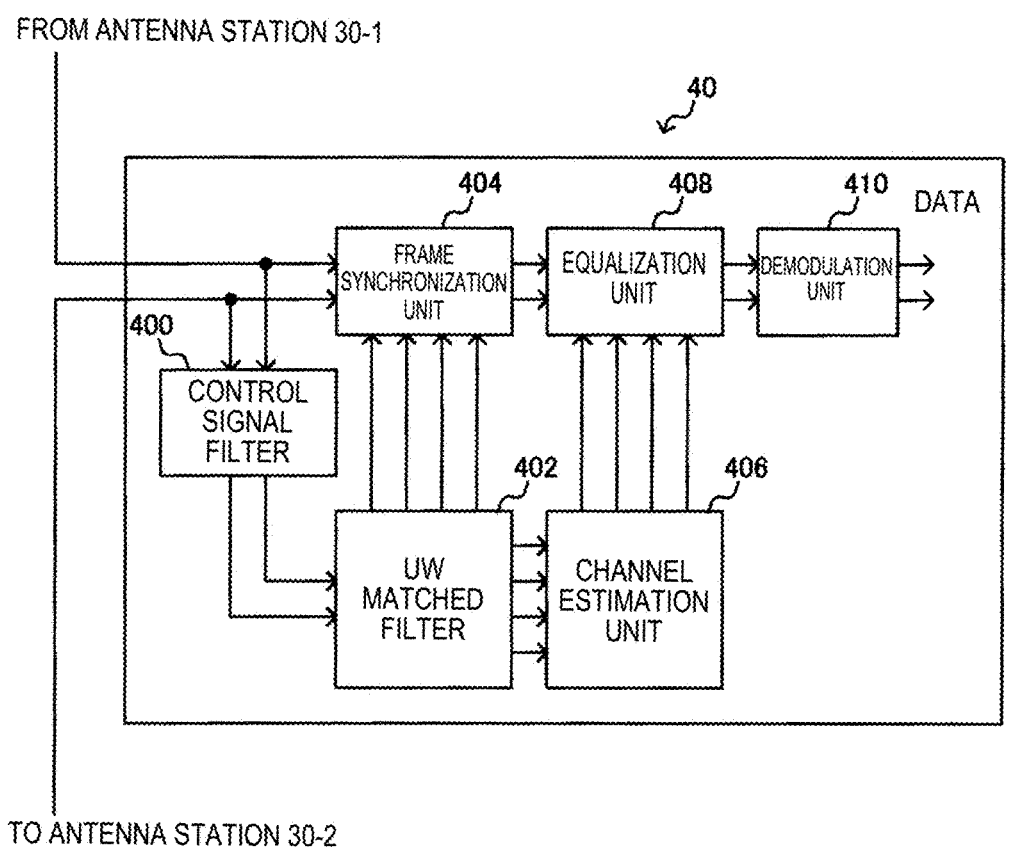
FIG. 6 is a function block diagram illustrating, by example, functions that a base station has.

Next, functions that the base station 40 has will more specifically be described. FIG. 6 is a function block diagram illustrating example functions that the base station 40 has. As illustrated in FIG. 6, the base station 40 includes a control signal filter 400, a UW matched filter 402, a frame synchronization unit 404, a channel estimation unit 406, an equalization unit 408 and a demodulation unit 410.

The control signal filter 400 aggregates the received signals with the respective sampling rates compensated for, the received signals being input from the antenna stations 30-1, 30-2, respectively, and transmits the control signals only, reproduces the symbol sequences of the control signals and outputs the symbol sequences to the UW matched filter 402.

The UW matched filter 402 is a matched filter for UWs of the control signals in the received signals, and outputs UW peak values, which are results of filtering, to the frame synchronization unit 404 and the channel estimation unit 406.

The frame synchronization unit 404 detects the peak values of the signals input from the UW matched filter 402, and detects frame start timings. Also, the frame synchronization unit 404 detects frame numbers via demodulation of the control signals and synchronizes the received signals input from the antenna stations 30-1, 30-2, respectively, via alignment of frame positions.

In other words, the frame synchronization unit 404 synchronizes respective frame timings of the data signals transmitted by the transmission station 10 via the antennas 100-1, 100-2, based on the control signals subjected to the sampling rate error compensation by the respective resamplers 306.

The channel estimation unit 406 generates a channel estimation matrix using IQ data of the UW peak values input from the UW matched filter 402 as complex channel estimation values, and outputs the channel estimation matrix to the equalization unit 408.

In other words, the channel estimation unit 406 estimates respective channels for the data signals transmitted by the transmission station 10 via the antennas 100-1, 100-2, based on the control signals subjected to the sampling rate error compensation by the respective resamplers 306.

The equalization unit 408 equalizes the received signals synchronized by the frame synchronization unit 404, on a frame-by-frame basis based on the channel estimation matrix (channel estimation information) input from the channel estimation unit 406, and outputs the resulting signals to the demodulation unit 410.

The demodulation unit 410 performs MIMO demodulation of the signals equalized by the equalization unit 408.

Figure 7:
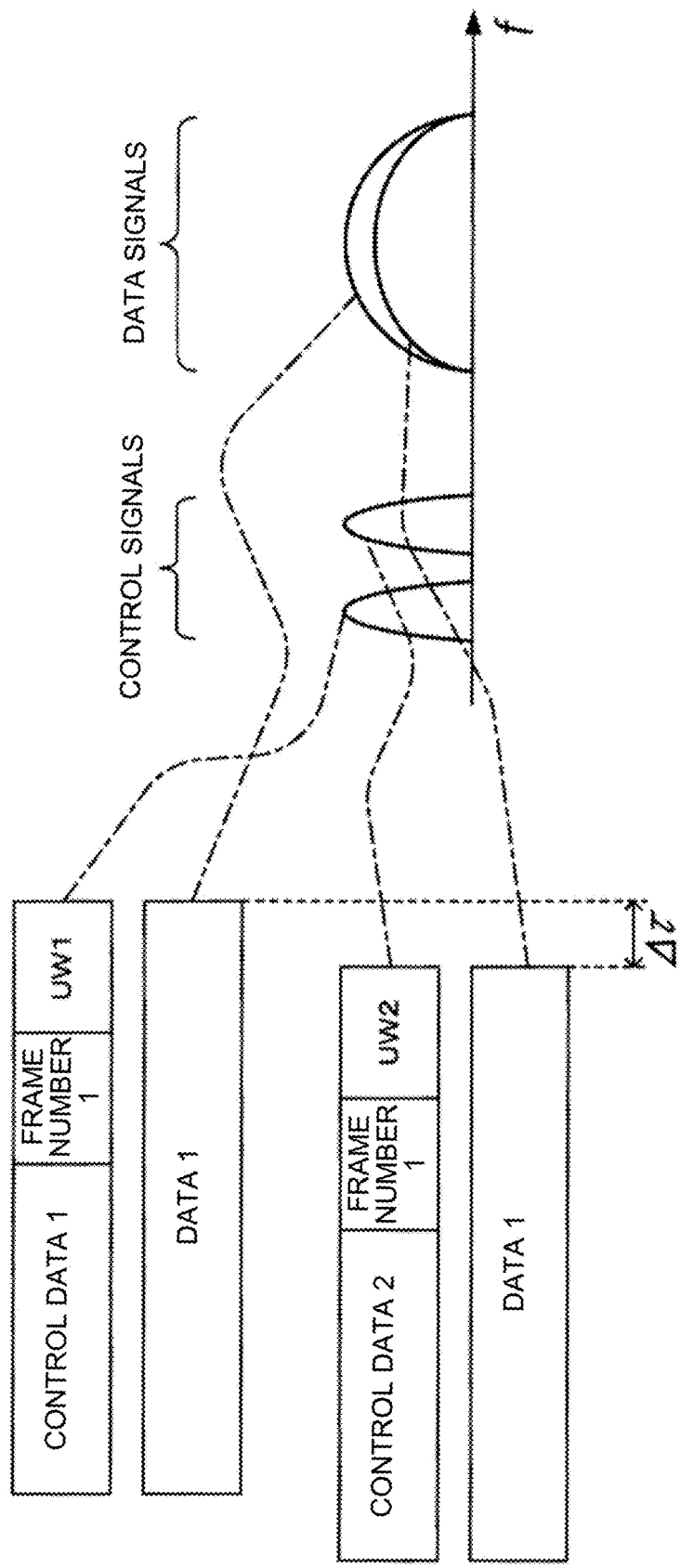
FIG. 7 is a diagram illustrating, by example, signals received by a reception station.

FIG. 7 is a diagram illustrating examples of signals received by the reception station 20. In the reception station 20, even if control signals received by the antenna stations 30-1, 30-2 are not synchronized (time error $\Delta\tau$), the control signals are equalized and demodulated after being synchronized with respective frame positions aligned, as described above.

In other words, even if the antenna stations 30-1, 30-2 are disposed at respective positions distant from each other, the reception station 20 compensate for respective sampling rate errors using the control signals received by the antenna stations 30-1, 30-2, respectively, and performs channel estimation and then equalizes the control signals, enabling MIMO demodulation.

Here, utilizing the flat frequency characteristic of the direct wave between the transmission station 10 and each antenna station 30, the reception station 20 applies the complex channel estimation values detected in the UWs of the control signals also to equalization of the data signals disposed in a different band.

Figure 8:
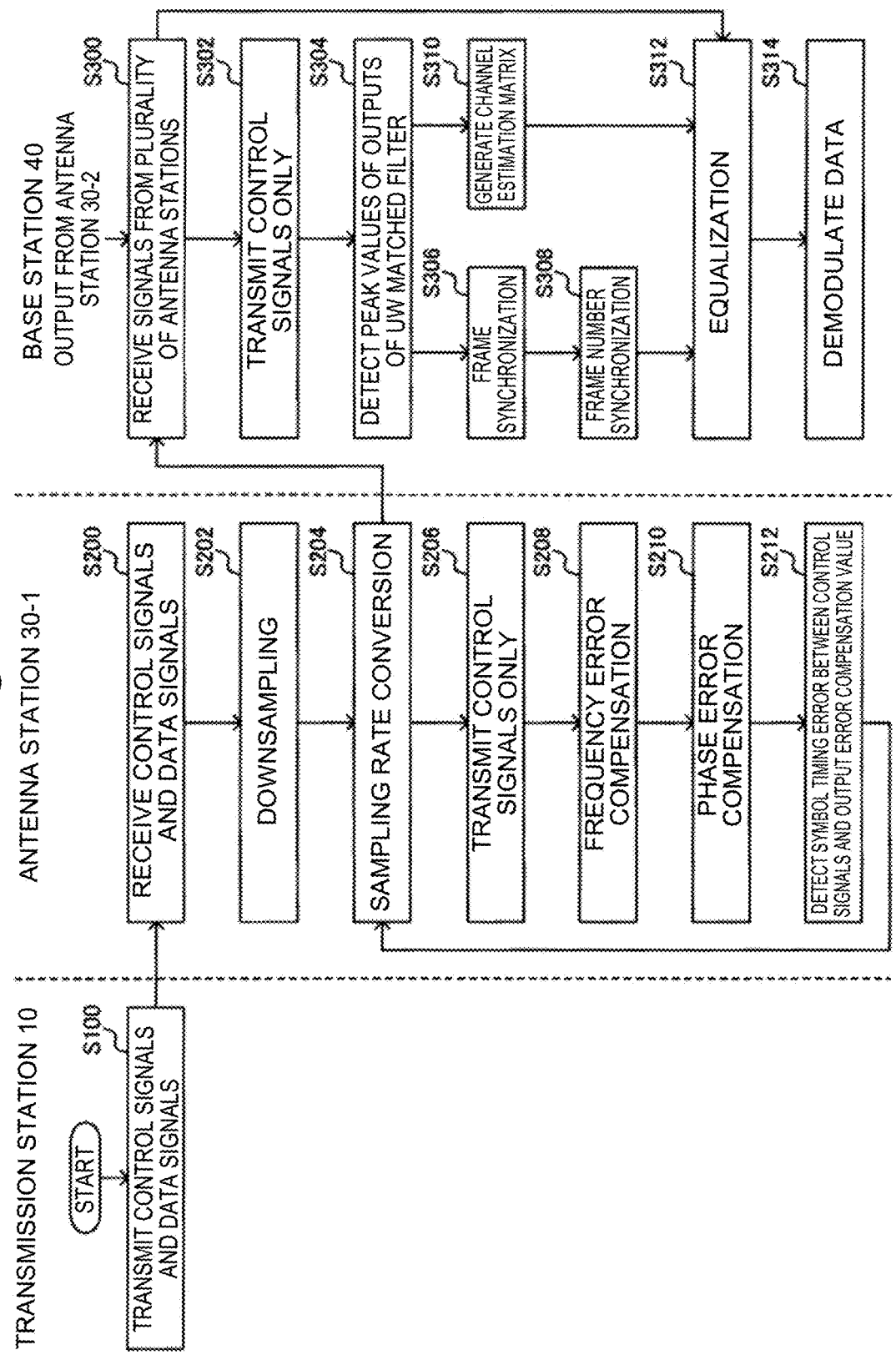
FIG. 8 is a diagram illustrating an example downlink operation of a wireless communication system.

FIG. 8 is a diagram illustrating example downlink operation of the wireless communication system 1.

As illustrated in FIG. 8, first, the transmission station 10 transmits respective control signals having different frequencies from the antennas 100-1, 100-2 and respective data signals having a same frequency from the antennas 100-1, 100-2 to the antenna stations 30-1, 30-2 (S100).

The antenna station 30-1 receives the control signals and the data signals transmitted by the transmission station 10 (S200) and performs downsampling (S202).

Next, the antenna station 30-1 repeats the processing in S204 to S212 and outputs the received signals with the sampling rate error compensated for to the base station 40.

In processing in S204, the antenna station 30-1 converts the received signals subjected to the downsampling by the downsampling unit 304 so as to have a predetermined sampling rate.

In processing in S206, in the antenna station 30-1, the control signal filter 308 transmits the control signals only.

In processing in S208, in the antenna station 30-1, the AFC unit 310 compensates for an error in frequency of the control signals.

In processing in S210, in the antenna station 30-1, the carrier reproduction unit 312 detects and compensates for a phase error between symbols of the control signals.

In processing in S212, in the antenna station 30-1, the clock reproduction unit 314 detects an error between symbol timings of the control signal and outputs a compensation value for the symbol timing error to the resampler 306 as reproduction of a clock.

Then, the base station 40 receives the received signals with the sampling rate error compensated for by the antenna station 30-1 and the received signals with the sampling rate error compensated for by the antenna station 30-2 (S300).

Next, in the base station 40, the control signal filter 400 aggregates the received signals and transmits the control signals only (S302), and the UW matched filter 402 outputs UW peak values to the frame synchronization unit 404 and the channel estimation unit 406 (S304).

In the base station 40, the frame synchronization unit 404 performs frame synchronization (S306) and frame number synchronization (S308) and outputs the resulting received signals to the equalization unit 408.

Also, in the base station 40, the channel estimation unit 406 generates a channel estimation matrix using IQ data of the UW peak values as complex channel estimation values and outputs the channel estimation matrix to the equalization unit 408 (S310).

Then, in the base station 40, the equalization unit 408 equalizes the received signals on a frame-by-frame basis (S312) and the demodulation unit 410 performs MIMO demodulation (S314).

As described above, in the wireless communication system 1, based on control signals with a sampling rate error compensated for by the reception station 20, frame timings are synchronized and channels for data signals are estimated, enabling, even where the antenna stations 30-1, 30-2 are disposed at different positions, receiving signals transmitted by the moving transmission station 10 via the antennas 100-1, 100-2, in such a manner that the signals are synchronized.

The respective functions of the transmission station 10 and the reception station 20 may be partly or fully configured by hardware or may be configured in the form of a program to be executed by a processor such as a CPU.

In other words, the wireless communication system 1 according to the present invention can be implemented using computers and programs, and each program can be recorded on a storage medium and can also be provided through a network.

Figure 9:
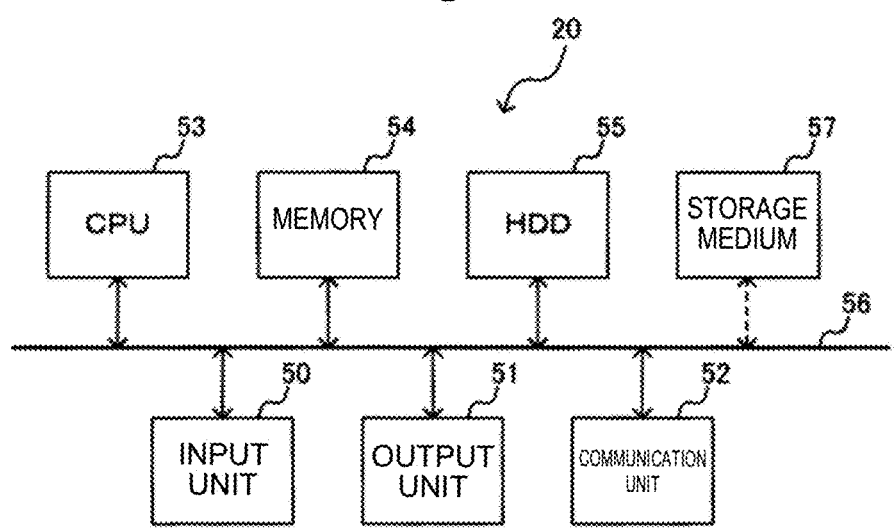
FIG. 9 is a diagram illustrating an example hardware configuration of a reception station according to an embodiment.

FIG. 9 is a diagram illustrating an example hardware configuration of a reception station 20 according to an embodiment. As illustrated in FIG. 9, a reception station 20 includes, for example, an input unit 50, an output unit 51, a communication unit 52, a CPU 53, a memory 54 and an HDD 55, which are connected via a bus 56, and has functions of a computer. Also, the reception station 20 is configured to be capable of acquiring an input of data from, and outputting data to, the storage medium 57.

Examples of the input unit 50 include, e.g., a keyboard and a mouse. The output unit 51 is, for example, a display device such as a display. The communication unit 52 is, for example, a wireless network interface.

The CPU 53 controls the respective units included in the reception station 20 and performs the above-described processing. The memory 54 and the HDD 55 store data. The storage medium 57 is capable of storing, e.g., a reception program for executing the functions that the reception station 20 has. Note that an architecture forming the reception station 20 is not limited to the example illustrated in FIG. 9. Also, the transmission station 10 may has a configuration that is similar to the configuration of the reception station 20.

REFERENCE SIGNS LIST 1 wireless communication system
10 transmission station
20 reception station
30-1, 30-2 antenna station
40 base station
50 input unit
51 output unit
52 communication unit
53 CPU
54 memory
55 HDD
56 bus
57 storage medium
100-1, 100-2, 300-1, 300-2 antenna
302-1, 302-2 clock generation sources
304 downsampling unit
306 resampler
308 control signal filter
310 AFC unit
312 carrier reproduction unit
314 clock reproduction unit
400 control signal filter
402 UW matched filter
404 frame synchronization unit
406 channel estimation unit
408 equalization unit
410 demodulation unit

The invention claimed is:

1. A reception method comprising:
a reception step of receiving a plurality of control signals transmitted in individual frequency bands by a moving transmission station via a plurality of transmission antennas and a plurality of data signals transmitted in a common frequency band by the transmission station via the plurality of transmission antennas in synchronization with the control signals, via each of a plurality of antennas disposed at different positions;
a resampling step of, based on symbol timings of the control signals received via the antenna, compensating for a sampling rate error between the respective control signals transmitted by the plurality of transmission antennas;
a frame synchronization step of, based on the control signals subjected to the sampling rate error compensation, synchronizing frame timings of the plurality of data signals transmitted by the transmission station via the plurality of transmission antennas;

a channel estimation step of, based on the control signals subjected to the sampling rate error compensation, estimating channels for the plurality of data signals transmitted by the transmission station via the plurality of transmission antennas; and an equalization step of equalizing the plurality of data signals with the frame timings synchronized, for the estimated channels.

2. A wireless communication method comprising:

a transmission step of causing a moving transmission station to transmit a plurality of control signals transmitted in individual frequency bands and transmit a plurality of data signals in a common frequency band in synchronization with the control signals, via a plurality of transmission antennas;

a reception step of causing a reception station to receive the plurality of control signals and the plurality of data signals transmitted by the transmission station, via each of a plurality of antennas disposed at different positions;

a resampling step of, based on symbol timings of the control signals received via the antenna, compensating for a sampling rate error between the respective control signals transmitted by the plurality of transmission antennas;

a frame synchronization step of, based on the control signals subjected to the sampling rate error compensation, synchronizing frame timings of the plurality of data signals transmitted by the transmission station via the plurality of transmission antennas;

a channel estimation step of, based on the control signals subjected to the sampling rate error compensation, estimating channels for the plurality of data signals transmitted by the transmission station via the plurality of transmission antennas; and an equalization step of equalizing the plurality of data signals with frame timings synchronized, for the estimated channels.

3. A reception station comprising: a plurality of antennas that are disposed at different positions and that each receive a plurality of control signals transmitted in individual frequency bands by a moving transmission station via a plurality of transmission antennas and a plurality of data signals transmitted in a common frequency band by the transmission station via the plurality of transmission antennas in synchronization with the control signals; a plurality of resamplers that, based on symbol timings of the control signals received by the relevant antenna, each compensate for a sampling rate error between the respective control signals transmitted via the plurality of transmission antennas; a processor; and a non-transitory storage medium having computer program instructions stored thereon, when executed by the processor, perform to: based on the control signals subjected to the sampling rate error compensation by the plurality of resamplers, synchronizes frame timings of the plurality of data signals transmitted by the transmission station via the plurality of transmission antennas; based on the control signals subjected to the sampling rate error compensation by the plurality of resamplers, estimates channels for the plurality of data signals transmitted by the transmission station via the plurality of transmission antennas; and equalizes the plurality of data signals with the frame timings synchronized, the channels for the plurality of data signals being estimated.

4. A non-transitory computer-readable medium having computer-executable instructions that, upon execution of the instructions by a processor of a computer, cause the computer to function as the reception station according to claim 3.

* * * * *